United States Patent Office 3,361,678
Patented Jan. 2, 1968

3,361,678
SILICON CARBIDE LUMINESCENT MATERIAL
Arrigo Addamiano, Willoughby, Ohio, assignor to General Electric Company, a corporation of New York
No Drawing. Filed Jan. 4, 1965, Ser. No. 423,326
12 Claims. (Cl. 252—301.4)

This application is a continuation-in-part of my co-pending application Ser. No. 376,244, filed June 18, 1964, bearing same title and now abandoned.

This invention relates to silicon carbide phosphors and their preparation. Silicon carbide has widespread applications, which include cutting tools (abrasives), heating elements, high temperature semi-conductor devices such as transistors, etc., but SiC phosphors with room temperature emission are not currently available. The object of this invention is to provide silicon carbide phosphors in the form of fine powders which show room temperature luminescence under ultraviolet excitation, under X-rays and cathode rays, and under electro-luminescent excitation as when an electric current, either D.C. or A.C., is passed tthrough them. Other objects are to provide convenient methods of preparing such phosphors.

The invention is more specifically concerned with SiC phosphors activated by a Group III element, namely boron, and coactivated by a Group V element, preferably nitrogen, or alternatively phosphorus. It has been found that a large number of these phosphors exist, due to the fact that SiC forms a large number of crystal modifications (usually referred to as polytypes), which have different optical and, more generally, physical properties. These polytypes can occur and be stable in each others presence and they are usually found in different amounts in the luminescent powders of the present invention. The properties of some of them are indicated in the following table which gives, in the order named, (1) the emission color, (2) the peaks of the emission bands, $E_{peak}$, expressed in electron-volts (e.v.), (3) the crystal structure symbols, and (4) the energy gaps.

| Emission Color | $E_{peak}$ (e.v.) | Structure Symbol | Energy Gap $E_{Gx}$ (e.v.) |
| --- | --- | --- | --- |
| Green | 2.317 | 4H | 3.263 |
| Yellow | 2.137 | 6H | 3.023 |
| Orange | 2.101 | 33R | 3.01 |
| Orange-Red | 2.049 | 15R | 2.986 |
| Red | 1.983 | 21R | 2.86 |

It is seen that, with the exception of the blue, phosphors have been prepared having emission throughout the visible range. In practice, however, the preparative methods described herein, lead to phosphors having the yellow or orange to orange-red component predominant, with minor amounts of green and red emitters. Attempts at shifting the distribution of the different polytypes have shown that the green component is favored by relatively low firing temperatures (below 2400° C.), for instance from 2200 to 2400° C., while the yellow component is favored at and above 2450° C., for instance from 2450 to 2600° C. At 2400–2450° C. the yellow component is the most abundant, together with substantial amounts of orange fluoroescing material, so that the phosphors obtained at about 2450° C. can be referred to as yellow or yellow-orange emitting phosphors.

Only extremely pure material lead to the formation of luminescent powders and the amount of activator and coactivator needed for good luminescence is severely restricted. Specifically, the amount of boron (usually added as $H_3BO_3$) needed for luminescence falls in the range of $5 \times 10^{-5}$ to $1 \times 10^{-3}$ atoms of boron per mole of silicon carbide; for best results it should be about $1 \times 10^{-4}$ to $5 \times 10^{-4}$ B atoms per mole of SiC formed. With more than $1 \times 10^{-3}$ B/SiC, dark powders with little or no luminescence are obtained. Conversely with less than $5 \times 10^{-5}$ B/SiC, the material is underdoped and only the low temperature (78° K.) blue luminescence of SiC appears outstanding.

Nitrogen, usually added to a firing atmosphere of pure argon, works well as a coactivator, and phosphorus has also been found suitable; other Group V elements can be expected to lead to similar results. The amount of nitrogen present in the firing atmosphere is critical. Too much nitrogen results in dark green or black materials without luminescence. In particular if the firing is done in an atmosphere of pure nitrogen, at or above atmospheric pressure, the dark powders obtained have a cubic zinc-blend structure with no appreciable luminescence, independent of the firing temperature. This is so even at temperatures much above 2300° C., which is generally quoted as the temperature at which cubic SiC converts to hexagonal or alfa-SiC. If the amount of nitrogen added is too little to compensate for the boron doping, the powders have again a dark body color and p-type conductivity and have no visible room temperature luminescence. Only when the amount of nitrogen present is enough to compensate for the charge deficiency resulting from the presence of boron in the lattice does bright room temperature luminescence occur; when properly compensated, the powder is a very light green color. In my experience and using the technique illustrated in the following examples, the best results were obtained by providing in a furnace having a volume of 12 liters an amount of pure nitrogen which gave a pressure of 0.1 to 1.5 mm. of $N_2$ at room temperature, the values changing according to the amount of B added. To this $N_2$ was usually added Ar until a slight positive pressure (4 to 6 lbs. per sq. in. gauge) was reached: the ratio of $N_2$ to $A_r$ in the furnace during firing was typically 1:10,000. The furnace was then sealed and the charge was fired at the desired temperature for a few minutes to a few hours. Firing times of 0.5 to 1 hour have given good results and are recommended. When the nitrogen present in the furnace came from incomplete exhaust of air, no adverse effects due to the oxygen present were usually noted. It is obvious, however, that a closer control of the system is obtained if purified dry nitrogen is introduced in the furnace after exhausting the system and gettering the residual gases. As getter I have used a titanium ribbon, located in the furnace, which was brought to incandescence by passing a current through it. As is well known, Ti forms nonvolatile refractory oxides and nitrides which help to clean up the atmosphere of the furnace. After this gettering operation the required amount of nitrogen was leaked into the furnace, and then the argon. Firing followed.

As raw materials I have used spectroscopically pure graphite and semiconductor grade silicon, though good results were obtained also with a pure silica powder ($SiO_2$), a commercial product known as Cab-O-Sil. Either the graphite or the silicon or silica or both are doped beforehand with boron, by adding the correct amount of a dilute solution of $H_3BO_3$ (or other suitable boron derivative) and bringing to dryness. Stoichiometric amounts of the reactants were usually employed, according to the equations:

$$Si + C = SiC \tag{I}$$

or $$3C + SiO_2 = 2CO + SiC \tag{II}$$

but no substantial differences were found by altering somewhat the ratios of C and Si or $SiO_2$. In particular it must be noted that as graphite crucibles were used in connection with the reaction, C can be considered to be in excess.

In preparing silicon carbide phosphors in accordance with the invention, the doping agents can be introduced either through a gas atmosphere reaction or through a solid state reaction.

GAS ATMOSPHERE REACTION

In this reaction, the reagents may contain some of the required nitrogen but in any event less than the full requirement, and the remainder is provided by causing the reaction to take place in an inert gas atmosphere such as argon, to which a trace of nitrogen is added. The nitrogen may also be provided in the form of $NH_3$, which may be added to the inert gas atmosphere. The reagents required may be classified into three groups as follows:

(1) Carbon (C)
(2) Silicon (Si), or silica ($SiO_2$)
(3) Boron (B), or boron oxide ($B_2O_3$), or boric acid ($H_3BO_3$) or boron carbide ($B_4C$), or boron nitride (BN).

Reagents are selected from each group in the necessary proportions to satisfy Equation I or II, and also provide the required proportion of boron atoms to moles of SiC. However, when boron nitride is used, then the proportion of nitrogen (or ammonia) admixed with the argon atmosphere is reduced accordingly.

SOLID STATE REACTION

In this reaction, the reagents contain the full requirement of nitrogen and the reaction is caused to take place in a sealed enclosure. The enclosure may be evacuated or filled with an inert gas such as argon. This method permits more accurate control of the reaction, including the proportion of nitrogen taking part. The reagents required may be classified into three groups as follows:

(1) Carbon (C)
(2) Silicon (Si), or silica ($SiO_2$), or silicon nitride ($Si_3N_4$)
(3) Boron (B), or boron oxide ($B_2O_3$), or boric acid ($H_3BO_3$), or boron carbide ($B_4C$), or boron nitride (BN).

The reagents are selected to satisfy Equation I or II. Also the reagents from the second group above provide the necessary silicon and part of the nitrogen, and the reagents from the third group provide the boron and the remainder of the nitrogen. In other words, the proportion of silicon nitride from the second group and of boron nitride from the third group are adjusted so that together they make up requirement of both boron and nitrogen.

The following examples further illustrate the preparation of SiC phosphors in accordance with the invention.

Example 1

(a) To a fine powder of spectroscopically pure graphite is added a solution of $H_3BO_3$ and the mixture is allowed to dry under stirring. After drying the ratio C:B (atomic) is $1:10^{-4}$.

(b) 3.00 g. of this boron doped C and 7.00 g. Si (semiconductor grade) are mixed together and the mixture is transferred to a crucible of spectrocopically pure graphite, which is then closed by a (screwable) lid.

(c) The crucible is now transferred to a carbon tube furnace, the furnace is evacuated, flushed with pure argon, then filled with 0.22 mm. of $N_2$ and enough argon to have a slight positive pressure, namely 4 p.s.i.g. at room temperature.

(d) The furnace is sealed off, the temperature raised to 2470° C. in about half an hour and allowed to stay at this temperature for one hour.

(e) After one hour at 2470° C. the power is shut off and the furnace allowed to cool.

(f) The furnace is opened and the charge extracted. After breaking the crucible the material is fired in air at 850–900° C. until all the carbon is eliminated.

(g) The SiC(B,N) phosphor is now treated by a mixture of $HF+HNO_3$ (4:1 by volume) to eliminate possible traces of silicon dioxide and unreacted silicon.

(h) The phosphor obtained is repeatedly washed with deionized water, until acid reaction no longer occurs. It is then dried and examined. A bright yellow luminescence appears under 3650 A. excitation, under cathode rays and X-rays. Individual crystal grains, contacted by thin metal wires (of tungsten, aluminum or copper) or by conductive glass and metal wire, emit bright light at voltages as low as 10–20 volts, either D.C. or A.C. The emission color, under these conditions, appears to be whitish-blue.

Example 2

The preparation is done as in Example 1 but the carbon is doped with $5 \times 10^{-4}B$ and the initial pressure of $N_2$ is 0.5 mm. After firing 1 hour at 2460° C. and quenching the product, a phosphor with bright yellow-orange emission with a few green fluorescing particles scattered throughout was obtained. This material is also luminescent when current is passed through it, and under cathode rays and X-rays.

Example 3

The preparation is done as in Example 1 using $C:10^{-4}B$ with 0.30 mm. of $N_2 + 4$ p.s.i.g. Ar, firing one hour at 2400–2420° C. At the end the phosphor obtained has a yellow-green luminescence, due to the presence of a relatively large amount of SiC with 4H structure. The brightness of the green luminescence is very much the same as that of the yellow luminescence, but the yellow luminescing, 6H-SiC, is in strong excess. Crystal grains having both the 4H and 6H crystal structure emit light by the application of an electric field, X-rays, cathode rays and ultraviolet radiation.

Example 4

The preparation is done as in Example 1, using $C:10^{-4}B$, 1 hour firing at 2330° C. with 0.5 mm. $N_2$ added. A thin layer (2 mm.) of spectroscopically pure carbon is added at both ends of the crucible to help reduce heat losses. The phosphor obtained, an account of the lower firing temperature, is a finer powder, quite uniform in particle size. It is a mixture of yellow fluorescing SiC, plus green fluorescing SiC, and orange luminescing particles (15 R—SiC).

Example 5

A mixture of Si and $C:10^{-4}B$ is fired for 1 hour at 2080° C. in an atmosphere of 0.25 mm. of $N_2 + 4$ p.s.i.g. Ar. Due to the low temperature used the material obtained is cubic, $\beta$-SiC, and has only red and infrared emission.

Example 6

After preparing a mixture of pure C and BN in the ratios $1:10^{-4}$, and a second mixture of 0.50 g. $C + 0.010$ g. $Si_3N_4$, to 3.00 g. of the $C:10^{-4}BN$ are added 0.20 g. of the mixture of $C + Si_3N_4$, and 7.00 g. of Si (semiconductor grade). The charge is set in the furnace in a crucible of spectroscopically pure graphite. The furnace is exhausted and flushed with argon many times, then filled to 4 p.s.i.g. pressure with Ar. At this point a Ti resistance in the furnace is brought to incandescence by the application of 120 volts A.C. (whereupon a current of 25 amps. passes through the resistance). After one-half hour the Ti is allowed to cool to room temperature and the charge of $C+Si+BN+Si_3N_4$ is fired one hour at 2460° C. Upon cooling, one obtains a bright green material with yellow-orange luminescence, as in the previous examples.

*Example 7*

To a mixture of Si and C in the ratio 1:1 is added an amount of boron phosphate $BPO_4$ corresponding to $10^{-4}$ moles $BPO_4/SiC$ (after reaction). By this means, boron as an activator and phosphorus as coactivator are provided simultaneously. The mixture is fired in a graphite crucible in an atmosphere of 4 p.s.i.g. argon containing 40 microns of air. After 1 hour firing at 2470° C. a phosphor with bright yellow-orange emission under 3650 A. excitation is obtained.

As a variant of the processes of the foregoing examples, the SiC:B,N phosphor may be prepared in a flowing atmosphere of $Ar+N_2$. The same initial procedure is followed, that is, one starts with a crucible filled with $Si+C+$a trace of $H_3BO_3$, and the furnace is thoroughly flushed out with argon. Thereafter a mixture of argon with a trace or small percentage of nitrogen is leaked into the furnace and allowed to flow slowly through it during the firing and cooling period. The proportion of nitrogen in the flushing gas governs its partial pressure and it is adjusted to satisfy the nitrogen requirements of the charge. This method has two main advantages.

(1) It permits operation of the furnace at atmospheric pressure throughout, thereby eliminating the need for a pressure proof furnace vessel or autoclave.

(2) The phosphor material is produced in an atmosphere whose composition remains constant (to a first approximation) throughout the period of its preparation.

I have found that phosphors prepared in this way tend to be more homogeneous than those prepared in a closed vessel where the concentration or partial pressure of the nitrogen decreases during the preparation.

The foregoing examples are typical and serve to illustrate some of the results obtained. However, as it is evident to those skilled in the art, many variations of the technique illustrated are possible. For instance both B and N can be added in the form of a fine powder of boron nitride, BN, and nitrogen can be added in the form of silicon nitrides, such as $Si_3N_4$ or as $C_2N_2$. Similarly B can be introduced in the atmosphere of the furnace in the form of a volatile B derivative, such as $BCl_3$ or other suitable compound. Also other elements besides B and N can be used for doping, or they can be added along with B and N to modify the emission color or other properties. While we have tried numerous modifications of the process, such as those mentioned above, and have studied the effects of numerous doping elements besides, or alongside with boron, the best results were obtained as described in the examples. Luminescence induced by elements other than boron, when present, usually peaks well below room temperature.

What I claim as new and desire to secure by Letters Patent of the United States is:

1. A homogeneous luminescent material consisting essentially of silicon carbide activated by $5\times10^{-5}$ to $1\times10^{-3}$ atoms of boron per mole of silicon carbide and coactivated by an element from the group consisting of nitrogen and phosphorus in a quantity sufficient to compensate for the charge deficiency resulting from the presence of boron.

2. Homogeneous material consisting essentially of silicon carbide activated by $1\times10^{-4}$ to $5\times10^{-4}$ atoms of boron per mole of silicon carbide and coactivated by nitrogen in a quantity at least sufficient to compensate for the charge deficiency resulting from the presence of boron and resulting in a light green body color.

3. Luminescent material as in claim 2 consisting of a mixture of polytypes with the yield of the 4H polytype having green emission enhanced by firing in the temperature range from 2200 to 2400° C.

4. Luminescent material as in claim 2 consisting of a mixtures of polytypes with the yield of the polytypes having orange or orange-red emission enhanced by firing in the temperature range from 2400 to 2450° C.

5. Luminescent material as in claim 2 consisting of a mixture of polytypes with the yield of the 6H polytype having yellow emission enhanced by firing in the temperature range from 2450 to 2600° C.

6. The method of preparing luminescent silicon carbide which comprises: mixing carbon, a material from the group consisting of silicon, silica, silicon nitride and mixtures thereof, and a material from the group consisting of boron, boron oxide, boric acid, boron carbide, boron nitride and mixtures thereof, silicon and carbon being present in said mixture in approximately the stoichiometric ratio in silicon carbide, and boron being present in an atomic ratio in the range of $5\times10^{-5}$ to $1\times10^{-3}$ relative to silicon; sealing said mixture in a furnace; providing additional nitrogen when required in order to effect charge compensation of the boron in the silicon carbide lattice; and raising the furnace temperature into the range of 2200 to 2700° C. to complete the reaction.

7. The method of preparing luminescent silicon carbide which comprises: mixing carbon, a material from the group consisting of silicon, silica and mixtures thereof, and a material from the group consisting of boron, boron oxide, boric acid, boron carbide, boron nitride and mixtures thereof, silicon and carbon being present in said mixture in approximately the stoichiometric ratio in silicon carbide, and boron being present in an atomic ratio in the range of $5\times10^{-5}$ to $1\times10^{-3}$ relative to silicon; sealing said mixture in a furnace; flushing said furnace with inert gas; filling said furnace with enough nitrogen to effect charge compensation of the boron in the silicon carbide lattice; and raising the furnace temperature into the range of 2200 to 2700° C. to complete the reaction.

8. The method of claim 7 wherein the nitrogen is provided in the form of ammonia.

9. The method of claim 7 wherein the furnace is filled with nitrogen in the pressure range from 0.1 to 1.5 millimeters of mercury at room temperature.

10. The method of claim 7 wherein the furnace is filled with nitrogen in the pressure range from 0.1 to 1.5 millimeters of mercury at room temperature and with inert gas in excess of atmospheric pressure.

11. The method of preparing luminescent silicon carbide which comprises: mixing carbon, a material from the group consisting of silicon, silica and mixtures thereof, and a material from the group consisting of boron, boron oxide, boric acid, boron carbide, boron nitride and mixtures thereof, silicon and carbon being present in said mixture in approximately the stoichiometric ratio in silicon carbide, and boron being present in an atomic ratio in the range of $5\times10^{-5}$ to $1\times10^{-3}$ relative to silicon; placing said mixture in a vessel; flushing said vessel with inert gas; flowing an inert gas having a small proportion of nitrogen added thereto through said vessel, the partial pressure of nitrogen provided thereby being sufficient to effect charge compensation of the boron in the silicon carbide lattice; and raising the temperature of the vessel into the range of 2200 to 2700° C. to complete the reaction.

12. The method of preparing luminescent silicon carbide which comprises: mixing carbon, a material from the group consisting of silicon, silica, silicon nitride and mixtures thereof, and a material from the group consisting of boron, boron oxide, boric acid, boron carbide, boron nitride and mixtures thereof, silicon and carbon being present in said mixture in approximately the stoichiometric ratio in silicon carbide, and boron being present in an atomic ratio in the range of $5 \times 10^{-5}$ to $1 \times 10^{-3}$ relative to silicon; the proportion of silicon nitride and boron nitride providing sufficient nitrogen to effect charge compensation of the boron in the silicon carbide lattice; sealing said mixture in a furnace; providing additional nitrogen when required in order to effect charge compensation of the boron in the silicon carbide lattice and raising the furnace temperature into the range of 2200 to 2700° C. to complete the reaction.

References Cited

UNITED STATES PATENTS

| | | | |
|---|---|---|---|
| 2,887,453 | 5/1959 | Billig et al. | 252—62.3 |
| 2,916,460 | 12/1959 | Van Der Beck | 23—208 |
| 3,025,192 | 3/1962 | Lowe | 252—62.3 |
| 3,236,780 | 2/1966 | Ozarow | 252—301.4 |

TOBIAS E. LEVOW, *Primary Examiner.*

R. D. EDMONDS, *Assistant Examiner.*